Feb. 23, 1932.  A. KONOFF  1,846,060

DOLL'S EYES WITH LASHES

Original Filed Nov. 13, 1926

Inventor
Alexander Konoff
By his Attorney

Patented Feb. 23, 1932

1,846,060

UNITED STATES PATENT OFFICE

ALEXANDER KONOFF, OF NEW YORK, N. Y., ASSIGNOR, BY MESNE ASSIGNMENTS, TO MARGON CORPORATION, OF NEW YORK, N. Y., A CORPORATION OF NEW YORK

DOLL'S EYES WITH LASHES

Original application filed November 13, 1926, Serial No. 148,135. Divided and this application filed August 28, 1928. Serial No. 302,547.

This invention relates to an improvement in doll eyes, and particularly to doll eyes with lashes formed as a part thereof, the present application being a division of pending application Serial No. 148,135, filed November 13th, 1926.

An object of the present improvement is to provide means for retaining the lashes in fixed connection with the eye ball or shell within a slit of the eye shell.

A more detailed object is to provide an eye ball structure having a slit therein in appropriate relation to the pupil of the eye and to make at least a portion of the shell yieldable to enable easy insertion of eye lash strands into or through the slit and to hold, or assist in holding, the strands fixed against displacement.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Figure 1:
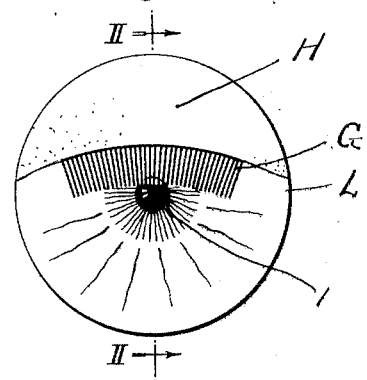
Fig. 1 is a front elevational view of an eye shell constructed in accordance with this invention.
Figure 2:
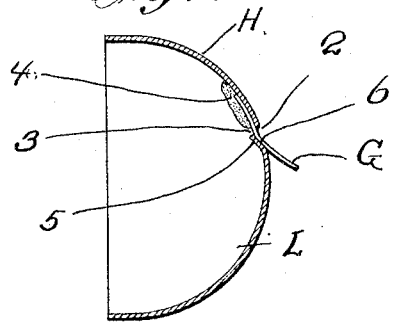
Fig. 2 is a vertical sectional view taken upon the plane of line II—II of Fig. 1.

Referring to the drawings for describing in detail the structure shown therein, and referring first to the structure Figs. 1 and 2, the reference character L indicates the main eye shell member. This is substantially hemispherical in shape, being formed of any appropriate material, such as thin sheet metal, sheet celluloid or the like and having visible upon its outer surface the representation of an iris as 1.

The eye lash as G is arranged in the appropriate position above the iris 1.

The outer surface of that portion, as H, of the shell lying above the eye lash G constitutes the eye lid portion of the shell and is preferably of flesh color so as to simulate the human eye lid, in contrast with the "white" portion of the eye upon the shell surrounding the iris 1.

The eye lash member G may consist simply of a series of hairs or strands held together in unitary form for handling as an entity in placing them in position in the eye structure, as more fully referred to in the mentioned co-pending application.

A slit 2 is provided through the material of the shell just above the iris 1 and the adjacent parts of the shell are shaped to provide an opening as 3 for accommodating the eye lash member G. The eye lash member is inserted through the opening 3 so that its inner end projects into the interior of the shell, and a quantity of suitable adhesive as 4 is provided for permanently connecting the inner ends of the eye lash strands with the inner surface of the shell.

If desired the portion of the eye lash member which projects into the shell may include as a part thereof a suitable adhesive element, as suggested in said co-pending application, adapted not only for holding the hairs assembled in unitary form but also for use in holding the eye lash member entity connected temporarily or permanently in proper position upon the inner surface of the shell prior to the application of the adhesive 4, or the adhesive 4 may in this event be dispensed with if preferred.

The material of the shell at one side of the slit, preferably the portion 5 immediately below the slit, is bent inwardly for the purposes, first, of opening the slit to a suitable extent to permit of the easy introduction of the eye lash member into and through the opening 3 thus provided and without necessity for removing any of the material of the shell to form said opening 3, second, of making said opening 3 to face in a direction downwardly toward the lower portion of the shell instead of directly outwardly radially of the shell, third, of providing a suitably inclined outer surface or shoulder portion as 6 immediately below the opening 3 across which the eye lash strands extend as they emerge from said opening, said inclined surface or shoulder being thereby adapted to direct the eye lash strands abruptly outwardly at a desired angle from the surface of the eye shell and from the lower edge of the eye lid forming part, and, fourth, of constituting a yielding portion of the shell readily bendable for partially closing the opening 3 and thus serving as a clamp member by which to fixedly hold the eye lash strands against the upper edge of the slit, thus to assist in the permanent retention of the eye lash member against displacement.

In some instances this clamping or binding grip against the eye lash strands may be sufficient without the use of the adhesive 4 or any other additional holding means.

Figure 3:
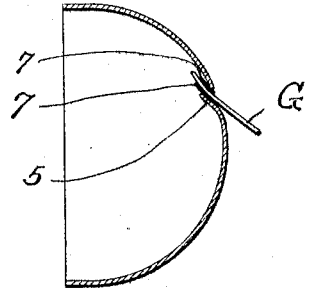
Fig. 3 is a similar sectional view showing a modified means of retaining the eye lash strands in position.

In the modification suggested in Fig. 3 it is contemplated that after the eye lashes have been inserted in proper position within the opening 3 then the portion 5 of the shell shall be bent outwardly again just a sufficient distance to grip the eye lash members as in a vice to hold the members as just described, and in order to prevent possible shearing of the eye lash strands when the part 5 is being moved to clamping engagement therewith it is suggested that re-inforcing pieces as 7—7 may be utilized in the regions which are directly engaged by the gripping parts of the shell at opposite sides of the slit.

Figure 4:
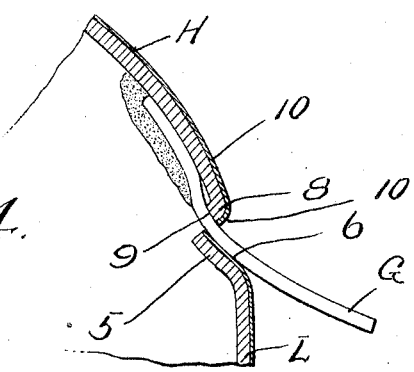
Fig. 4 is an enlarged fragmentary sectional view corresponding with a portion of Fig. 2 but illustrating a slightly modified form of the eye lid part of the structure.

The structure Fig. 4 is identical with that described above except that it proposes that the lower edge of the eye lid portion of the shell shall be turned or bent inwardly as at 8. This form of the lower edge of the eye lid portion of the shell produces the appearance of greater thickness of said eye lid portion, and furthermore it disposes the raw edge as 9 of the eye lid portion in an obscure position and brings the colored surface portion as 10 of the lid around to constitute the lower edge of the completed lid, the whole effect being a much closer simulation of the human eye lid than if the lower edge of the eye lid were left exposed as a severed piece of material. The advantage of this arrangement will be apparent when it is understood that the actual thickness of the material from which eye shells are manufactured is little more than the thickness of a sheet of ordinary writing paper.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. The herein described method of producing artificial eyes having lashes thereon, which method consists in providing an eye shell member having the representation of an iris on the wall thereof, forming a slit through said eye shell member in the appropriate position for an eye lash, bending inwardly the material of the shell at one side of the slit to thereby open the slit with a downwardly facing opening, arranging an eye lash member in appropriate position within said opening, and then bending back again the inwardly bent portion of the shell into clamping engagement against the eye lash member to thereby clamp the eye lash member in a downwardly projecting direction.

2. An eye structure comprising a semispherical shell formed of sheet material having the representation of an iris thereon, an eye lash member carried by said shell projecting therefrom adjacent the upper edge of the iris, the material of the shell immediately above the eye lash member being turned inwardly to simulate the thickness of an eye lid, and the material of the shell immediately below the eye lash member constituting a clamp member co-operative with the turned in portion of the shell above the eye lash member to hold the eye lash member in position.

3. An eye structure comprising a semispherical shell formed of sheet material having the representation of an iris thereon, an eye lash member carried by said shell projecting therefrom adjacent the upper edge of the iris, the material of the shell immediately above the eye lash member being turned inwardly to simulate the thickness of an eye lid, and the material of the shell immediately below the eye lash member being bendable and serving thereby as a clamp member co-operative with the turned in portion of the shell above the eye lash member to hold the eye lash member in position.

4. An eye structure comprising a semispherical shell formed of sheet material having the representation of an iris thereon, the outer surface of said shell above said iris being colored to represent an eye lid, an eye lash member carried by said shell projecting therefrom at the lower edge of the eye lid, the material of the shell comprising the lower edge of the lid being turned inwardly to increase the apparent thickness of the lower edge of the eye lid and carry the surface color of the lid across said thickened edge, and the material of the shell below the lower edge of the eye lid constituting clamp means co-operative with said lower edge to hold the eye lash member in position.

5. An eye structure comprising a generally semispherical hollow shell formed from a single piece of sheet material, said shell having the representation of an iris on its outer surface, an integral portion of the piece of material comprising the shell being shaped to provide an upwardly and inwardly inclined shoulder directly upon the shell in the appropriate position of an eye lash above said iris, an eye lash member engaging said shoulder, and a further integral portion of the piece of material comprising the shell above said shoulder standing in engagement with the eye lash member co-operative with the shoulder forming portion of the shell to constitute therewith a manually operable mechanical clamp to grip the eye lash member to thereby hold the eye lash member against displacement and to hold said eye lash member against said shoulder.

6. An eye structure comprising a substantially continuous semi-spherical eye shell, the wall of said eye shell having a representation of an iris thereon, said shell having a slit formed through its thickness above said iris, the material of the shell at the lower side of said slit being turned inwardly and being directed upwardly to form a supporting shoulder, and an eye lash member in said slit projecting outwardly therefrom and supported by said shoulder, the material of the shell at the opposite sides of the slit being in clamping engagement with the eye lash member serving to clamp the eye lash member against displacement, and means to reinforce the eye lash member in the clamped region thereof.

7. An eye structure comprising a hemispherical shell formed of sheet material and having the representation of an iris thereon, an eye lash carried by said shell projecting therefrom adjacent the upper edge of the iris, and the material of the shell immediately above the eye lash being turned inwardly to simulate the thickness of an eye lid.

In testimony whereof I affix my signature.

ALEXANDER KONOFF.